United States Patent [19]
McDonough et al.

[11] Patent Number: 6,115,693
[45] Date of Patent: Sep. 5, 2000

[54] QUALITY CENTER AND METHOD FOR A VIRTUAL SALES AND SERVICE CENTER

[75] Inventors: Charles McDonough; W. Mike Bethea; Bonnie Yeckley, all of Charlotte, N.C.

[73] Assignee: Andersen Consulting LLP, Chicago, Ill.

[21] Appl. No.: 09/061,999

[22] Filed: Apr. 17, 1998

[51] Int. Cl.⁷ .............................. G06F 15/21; H04M 1/69; H04M 15/00
[52] U.S. Cl. ....................................... 705/10; 705/9; 705/8; 705/11; 705/7; 705/26; 379/34; 379/220; 379/225
[58] Field of Search ............................. 379/34, 220, 225; 705/10, 9, 26

[56] References Cited

U.S. PATENT DOCUMENTS

| | | | |
|---|---|---|---|
| 4,289,934 | 9/1981 | Pitroda et al. | 379/269 |
| 4,466,098 | 8/1984 | Southard | 714/12 |
| 4,674,036 | 6/1987 | Conforti | 709/400 |
| 4,700,381 | 10/1987 | Eher | 379/279 |
| 4,737,983 | 4/1988 | Frauenthal et al. | 379/221 |
| 4,755,995 | 7/1988 | Anderson et al. | 714/31 |
| 4,866,763 | 9/1989 | Cooper et al. | 379/221 |
| 4,881,261 | 11/1989 | Oliphant et al. | 379/215 |
| 4,951,310 | 8/1990 | Honda et al. | 379/266 |
| 4,988,209 | 1/1991 | Davidson et al. | 370/270 |
| 5,023,868 | 6/1991 | Davidson et al. | 370/221 |
| 5,031,211 | 7/1991 | Nagai et al. | 379/221 |
| 5,036,535 | 7/1991 | Gechter et al. | 379/210 |
| 5,062,103 | 10/1991 | Davidson et al. | 370/270 |
| 5,073,890 | 12/1991 | Danielsen | 370/270 |
| 5,113,430 | 5/1992 | Richardson, Jr. et al. | 379/88 |
| 5,153,909 | 10/1992 | Beckle et al. | 379/265 |
| 5,175,866 | 12/1992 | Childress et al. | 455/8 |
| 5,185,780 | 2/1993 | Leggett | 379/34 |
| 5,193,110 | 3/1993 | Jones et al. | 379/93.14 |
| 5,214,688 | 5/1993 | Szlam et al. | 379/67 |
| 5,247,569 | 9/1993 | Cave | 379/113 |
| 5,271,058 | 12/1993 | Andrews et al. | 379/210 |
| 5,291,492 | 3/1994 | Andrews et al. | 370/259 |
| 5,291,550 | 3/1994 | Levy et al. | 379/242 |
| 5,291,551 | 3/1994 | Conn et al. | 379/265 |
| 5,299,259 | 3/1994 | Otto | 379/221 |
| 5,309,505 | 5/1994 | Szlam et al. | 379/88 |
| 5,309,513 | 5/1994 | Rose | 379/88 |
| 5,317,627 | 5/1994 | Richardson, Jr. et al. | 379/221 |
| 5,325,292 | 6/1994 | Crockett | 705/9 |
| 5,335,268 | 8/1994 | Kelly, Jr. et al. | 379/112 |
| 5,335,269 | 8/1994 | Steinlicht | 379/266 |
| 5,341,374 | 8/1994 | Lewen et al. | 370/450 |
| 5,353,339 | 10/1994 | Scobee | 379/207 |
| 5,355,403 | 10/1994 | Richardson, Jr. et al. | 379/88 |
| 5,392,345 | 2/1995 | Otto | 379/265 |

(List continued on next page.)

*Primary Examiner*—Allen R. MacDonald
*Assistant Examiner*—Jagdish Patel
*Attorney, Agent, or Firm*—Merchant & Gould P.C.

[57] ABSTRACT

A Quality Center for a Virtual Sales and Service Center. The Quality Center is responsible for monitoring the "customer experience" across the telephone customer access resource. The Quality Center assists in managing the business of operating multiple call centers as a single Virtual Sales and Service Center and presents the business in a professional, informative and impressive manner. The Quality Center includes a forecasting system for predicting contact volume for a plurality of physical locations forming a Virtual Sales and Service Center, a monitor for monitoring contact traffic for the Virtual Sales and Service Center, a controller for controlling network routing based upon the call volume predictions and the contact traffic monitoring and a processor for providing an interface between the forecasting system, the monitor and the controller and for servicing requests and response therebetween. The Quality Center may further include a reporting system for accessing statistics for generating management reports regarding the operation of the Virtual Sales and Service Center, a messaging system for providing messaging between the physical locations and a trouble-shooting system for analyzing and solving problems occurring in the Virtual Sales and Service Center.

64 Claims, 7 Drawing Sheets

U.S. PATENT DOCUMENTS

| | | | |
|---|---|---|---|
| 5,392,346 | 2/1995 | Hassler et al. | 379/265 |
| 5,402,474 | 3/1995 | Miller et al. | 379/93.12 |
| 5,404,350 | 4/1995 | DeVito et al. | 370/217 |
| 5,450,482 | 9/1995 | Chen et al. | 379/207 |
| 5,452,350 | 9/1995 | Reynolds et al. | 379/220 |
| 5,459,780 | 10/1995 | Sand | 379/265 |
| 5,467,268 | 11/1995 | Sisley et al. | 705/9 |
| 5,467,391 | 11/1995 | Donaghue, Jr. et al. | 379/265 |
| 5,546,452 | 8/1996 | Andrews et al. | 379/219 |
| 5,555,299 | 9/1996 | Maloney et al. | 379/212 |
| 5,559,877 | 9/1996 | Ash et al. | 379/221 |
| 5,590,188 | 12/1996 | Crockett | 379/225 |
| 5,590,269 | 12/1996 | Kruse et al. | 705/9 |
| 5,594,791 | 1/1997 | Szlam et al. | 379/265 |
| 5,684,870 | 11/1997 | Maloney et al. | 379/212 |
| 5,737,728 | 4/1998 | Sisley et al. | 705/8 |
| 5,768,360 | 6/1998 | Reynolds et al. | 379/220 |

QUALITY CENTER AND METHOD FOR A VIRTUAL SALES AND SERVICE CENTER

CROSS-REFERENCE TO RELATED APPLICATIONS

This application is related to:

Application Ser. No. 09/062,151, entitled "A Virtual Customer Sales and Service Center And Method," filed on same date herewith by Charles McDonough et al., and assigned to the assignee of this application;

Application Ser. No. 09/062,492, entitled "Context Manager and Method For A Virtual Sales and Service Center," filed on same date herewith by Jim Smith et al., and assigned to the assignee of this application; and Application Ser. No. 09/062,335, entitled "A Rule Based Routing System And Method For A Virtual Sales and Service Center," filed on same date herewith by Charles McDonough et al., and assigned to the assignee of this application.

All of the above-identified applications are incorporated by reference herein.

BACKGROUND OF THE INVENTION

1. Field of the Invention

This invention relates in general to a Virtual Sales and Service Center, and more particularly to a method and apparatus for connecting a customer to any type of customer access resource through any media at any time from any customer location.

2. Description of Related Art

In the United States, telecommunications is an industry that is undergoing convergence. There is a good deal of discussion about the consolidation of computing and telecommunications into one overarching entity. There is also lot of talk about one wire to the home and one even larger wire or cable to the business.

The trend toward universal data access has brought the focus of two technologies to the solution of a single problem, i.e., integrating telephones and computers to provide access and control of the data residing on both platforms. Computer telephone integration (CTI) is a technology platform that merges voice and data services at the functional level to add tangible benefits to business applications. CTI technology combines voice and data to form a foundation to support business applications, seamlessly combining functions from both the telephony world and the computing world.

Over the years, telecommunications and data technologies have grown more alike. The independent features offered by telephones and computers become even more powerful, useful, and convenient when combined into voice processing applications running on computers. In today's business environment, the telephone is often the primary means of communication in many different situations: placing catalog orders, checking airline schedules, querying prices, reviewing account balances, and recording and retrieving messages. Usually, each telephone call involves a service representative talking to a caller, asking questions, entering responses into a computer, and reading information to the caller from a terminal screen.

When organizations automate this process by linking their computer and telephone systems, they can lower costs, provide better customer service, increase the number of services available, and extend hours of operation. CTI lets customers, for example, use their touch-tone phone to check their bank balance 24 hours a day rather than walk to a cash machine or wait on hold for a customer service representative. And the marriage of phone and computer systems can identify incoming calls, route them to the appropriate person, and deliver the caller's file on a computer screen to the person answering the call—before the call is answered. Accordingly, the road to greater profit runs through a call center for high quality, low-cost customer acquisition and retention.

Today's computer-telephone integration offerings enhance a range of emerging technologies, such as:

Interactive voice response: the ability to input and retrieve information from a computer database via a touch-tone phone;

Fax publishing: the ability to request that fax information be automatically forwarded to the caller via touch-tone phone ;

Two-way message notification: the ability to link voice mail and electronic mail (E-mail) systems so that users can collect all messages—voice and data—via a single source CTI provides many benefit to consumers. For example, CTI allows consumers to spend less time on hold, improves response time for callers once they get through to the company, allows instant access to database information, often on a 24-hour basis; provides callback options for callers who don't want to stay on hold, provides access to service reps who, when freed from routine functions, have more time to research and answer complicated questions, and eliminates the need to repeat identification information and reason for calling when transferred to another resource or department.

Businesses also benefit from the use of CTI. For example, the benefits of CTI to business includes prompter and more accurate response to inquiries, orders, and service requests, personalized attention and efficient problem resolution, improved customer and prospects access to information about new products and services, increased number of services available and extended hours of operation Increased telesales revenue, higher levels of referral and repeat business, fewer data entry keystroke errors, shorter transaction time, increased resource productivity, improved resource morale, and cost savings from operational efficiency.

Today, the majority of CTI applications are being built for call centers. A call center is a customer business center where initial access is by telephone. Agents working in call centers provide services over the telephone. Their tasks can include placing outgoing calls, answering incoming calls, asking callers for information, or providing services. While handling calls, agents often use desktop computers to enter or retrieve information.

Current call center routing techniques can be difficult to manage and do not simplify the interaction for customers. Routing services within a call center have traditionally been provided through caller initiated functions such as selecting one of several 800 numbers or making a particular selection in the voice response unit (VRU). The routing services do not provide for an effective match of skilled agents with customer value and need. Multi-site call center routing is typically a simple percentage allocation of calls to various sites achieved through the network carrier. Overflow services are managed through the re-assignment of resources to queues. The goal in all these methods is to provide some level of improved service to the customer through a better match of calls to skilled agents and a better use of available agents. These approaches require many different mechanisms to provide contact routing. These mechanisms include: various 800 numbers, network carrier load balancing, VRU routing to queues and static realignment of agents to queues.

The typical CTI call center makes use of products and services from several different sources: public and private networks; voice switches, automatic call distributors, hardware and software from computer vendors, specialized business applications from software suppliers, and components such as voice response units, voice mail systems, call sequencers, predictive dialers, and fax machines.

Multiple call centers may be integrated to form a single Virtual Call Center that operates a comprehensive, coherent unit. Nevertheless, such a complex system would result in management difficulties. If the companies' other customer access resources were to be integrated into to such a virtual call center it would become a virtual sales and service center. However, the complexity of managing such a virtual resource would grow tremendously.

In order to monitor the customer experience across multiple customer access resources of a Virtual Sales and Service Center, all operations and functions of the Virtual Sales and Service Center need to be integrated.

It can be seen then that there is a need for a Quality Center to assist in managing the business of operating multiple customer access resources as a single Virtual Sales and Service Center.

SUMMARY OF THE INVENTION

To overcome the limitations in the prior art described above, and to overcome other limitations that will become apparent upon reading and understanding the present specification, the present invention discloses a Quality Center for a Virtual Sales and Service Center.

The present invention solves the above-described problems by providing a Quality Center that is responsible for monitoring the "customer experience" across all customer access resources. The Quality Center assists in managing the business of operating multiple customer access resources as a single Virtual Sales and Service Center and presents the business in a professional, informative and impressive manner.

A system in accordance with the principles of the present invention includes a forecasting system for predicting contact volumes for a plurality of physical locations forming a Virtual Sales and Service Center, a monitor for monitoring contact traffic for the Virtual Sales and Service Center, a controller for controlling network routing based upon the contact volume predictions and the contact traffic monitoring and a processor for providing an interface between the forecasting system, the monitor and the controller and for servicing requests and response therebetween.

Other embodiments of a system in accordance with the principles of the invention may include alternative or optional additional aspects. One such aspect of the present invention is that the Quality Center further includes a reporting system for accessing statistics for generating management reports regarding the operation of the Virtual Sales and Service Center, a messaging system for providing messaging between the physical locations and a troubleshooting system for analyzing and solving problems occurring in the Virtual Sales and Service Center.

Another aspect of the present invention is that the processor further includes a plurality of inputs for receiving signals from the plurality of physical locations.

Another aspect of the present invention is that the monitor monitors information regarding contact volumes for the plurality of physical locations in real time.

Another aspect of the present invention is that the contact volume information is used to guide network routing decisions controlled by the controller.

Another aspect of the present invention is that the controller comprises routing rules, the controller making modifications to the routing rules to change how contacts are routed to individual resources.

Another aspect of the present invention is that the messaging system processes messages between the plurality of physical locations regarding system availability and outages.

Another aspect of the present invention is that the forecasting system enables the planning of resource and staffing requirements.

Another aspect of the present invention is that the forecasting system provides real-time adherence of resources and teams against a schedule.

Still another aspect of the present invention is that the reporting system accesses statistics servers for generating history reports.

Another aspect of the present invention is that the monitor measures end-to-end process flows for outlining the process for monitoring the Virtual Sales and Service Center, analyzing the key statistics, and gathering information.

Another aspect of the present invention is that the monitor provides data to decision makers for maintaining a high performance framework for business processes.

Another aspect of the present invention is that the Quality Center further includes an information delivery architecture for enabling the gathering and reporting of performance data.

Another aspect of the present invention is that the processor gathers statistics from system events and transforms the statistics into meaningful business statistics.

Another aspect of the present invention is that the Quality Center further includes a display for displaying performance data.

Another aspect of the present invention is that the displayed performance data may be specifically tailored for different users to ensure that information flows to key decision makers in a timely manner in order to effectively manage the environment.

Another aspect of the present invention is that the monitor monitors contact traffic within the Virtual Sales and Service Center for making adjustments to contact routing.

Yet another aspect of the present invention is that the monitor receives real-time information as to the availability of all systems.

Another aspect of the present invention is that the Quality Center further includes a call manager for monitoring call volume in real-time according to selected parameters.

Another aspect of the present invention is that the monitor facilitates adjustments to the Virtual Sales and Service Center for changing the timing parameters on overflow rules.

Another aspect of the present invention is that the monitor facilitates adjustments to the Virtual Sales and Service Center for sending out broadcast/alert messages to warn the physical locations of extremely high volume situations.

Another aspect of the present invention is that the processor performs analysis on contact statistics in conjunction with business parameters.

Another aspect of the present invention is that the Quality Center further includes an on-line analytical processing for promoting the gathering of performance information and analysis of trends and statistics for operational management of the Virtual Sales and Service Center.

Another aspect of the present invention is that the Quality Center further includes a helpline for identifying and resolving operational problems.

Another aspect of the present invention is that the Quality Center further includes a customer feedback repository for storing feedback from customers.

Another aspect of the present invention is that the Quality Center further includes a quality control center for verifying call handling efficiency, fulfillment timeliness and accuracy checkpoints.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention is a Virtual Sales and Service Center that provides connection of customers to a resource through any media at any time from any customer location.

Figure 1:
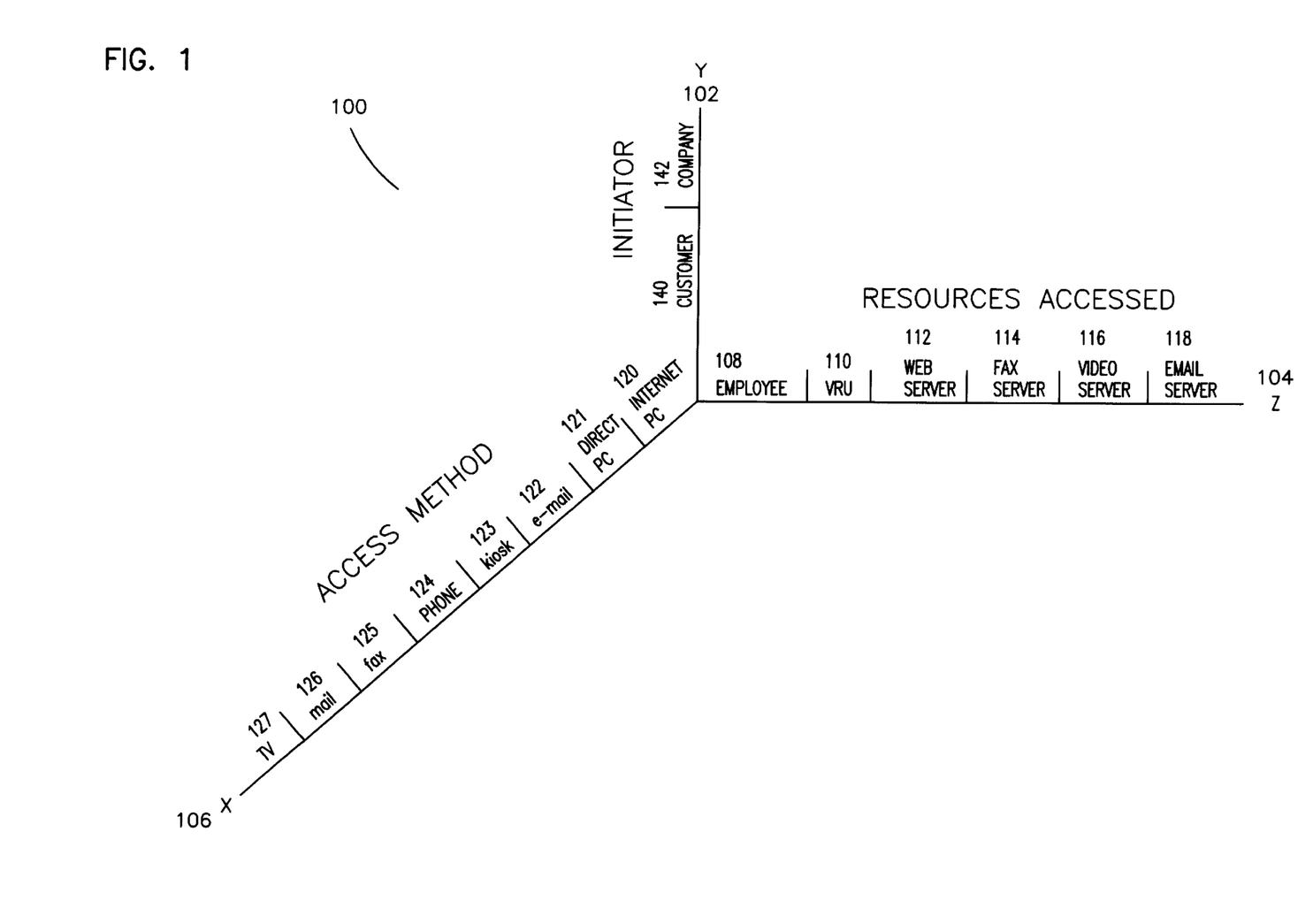
FIG. 1 illustrates a three dimensional representation of the Virtual Sales and Service Center functionality.

FIG. 1 illustrates a three dimensional representation of the Virtual Sales and Service Center access logistics 100. In FIG. 1, the y axis 102 represents the contact initiator. A customer contact may either be initiated by the customer 140 or by the company 142.

The x axis 106 represents the access method of the customer. Customers may access the Virtual Sales and Service Center from a wide variety of locations using a variety of methods. For example, a customer may access a company through the Internet 120. A customer may access a web page to retrieve customer or company information. The information at the web page may be unsecured information concerning a company's services and/or products. Alternatively, a customer may access secured, personal or private information via encryption, authentication and other digital security measures. Those skilled in the art will recognize that the invention is not limited to a particular instrumentality however.

Other customer access methods may include direct pc access 121, e-mail 122, kiosk 123, phone 124, fax 125, mail 126, tv 127 etc. Those skilled in the art will recognize that the type of customer access method is not meant to be limited to the particular examples outlined herein. The invention provides the interface with any type of customer hardware and access method.

The z axis 104 represents the resources accessed during the contact with the company. The types of resources accessed may include an employee 108. Employees 108 may be in thousands of locations ranging from large call centers with hundreds of persons to small offices or branches with a single person. The skills of employees may vary tremendously including product knowledge, language, sales ability, knowledge of specific customers, etc. As a result, the logistics associated with effectively matching customer contacts are particularly challenging and the benefits are particularly high.

Other resources accessed by customers include the VRU 110, web server 112, fax server 114, video server 116, e-mail server 118, etc. Those skilled in the art will recognize that the type of resource is not meant to be limited to the particular examples outlined herein. The invention provides the interface with any type of resource existing within the company.

Figure 2:
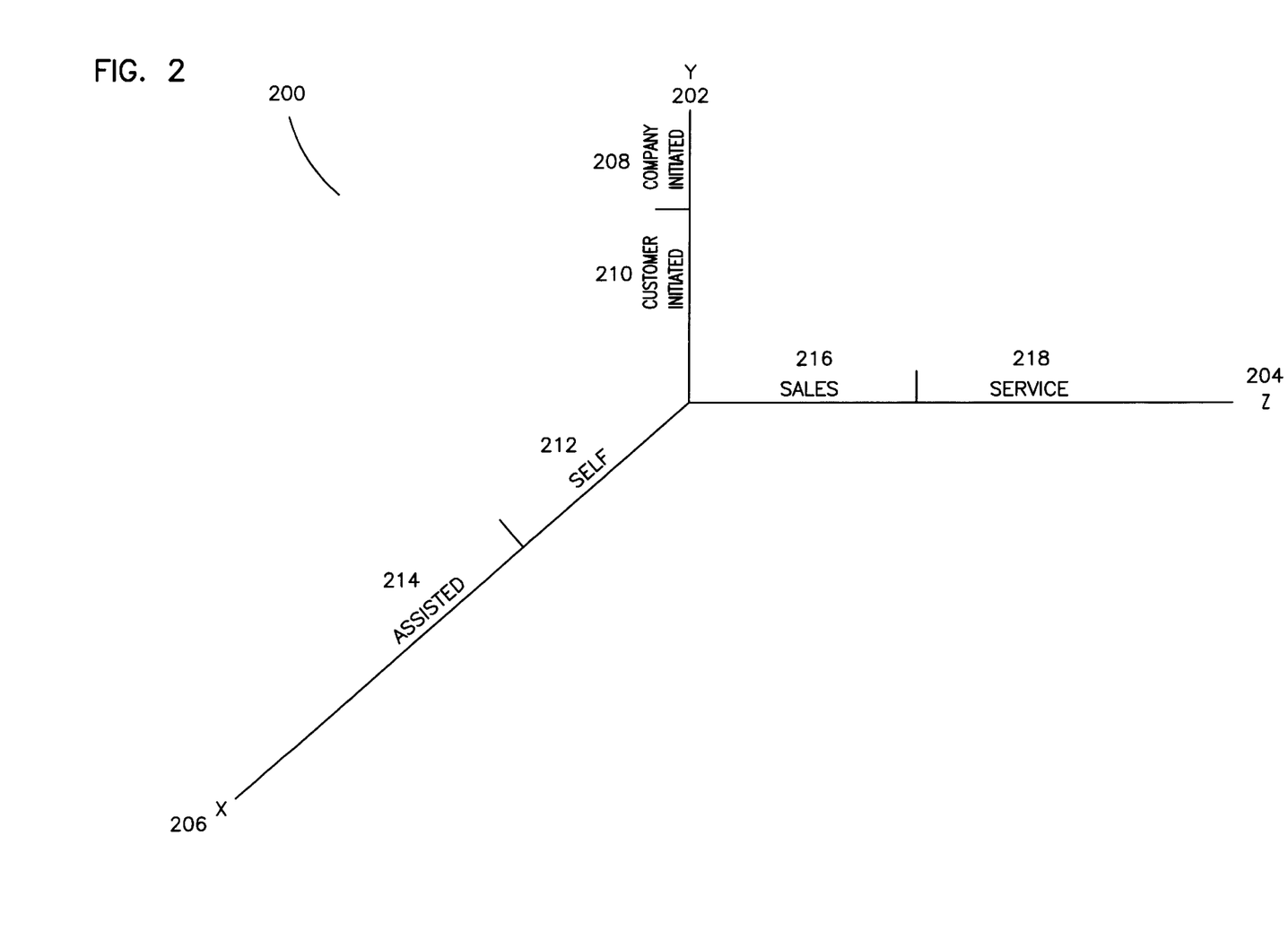
FIG. 2 illustrates the range of customer interactions included with in the scope of the invention.

FIG. 2 illustrates the types of customer interaction 200 included in the scope of this invention.

The y axis 202 represents the initiator. A customer contact may either be initiated by the customer 210 or by the company 208.

The z axis 204 represents the customer purpose. The overall purpose may be sales 216 or service 218.

The x axis 206 represents the interaction style. The interaction style may be self-assisted 212 or assisted 212.

The invention includes the routing and customer-resource matching algorithms to effectively handle any interaction style within the framework shown in FIG. 2

Figure 3:
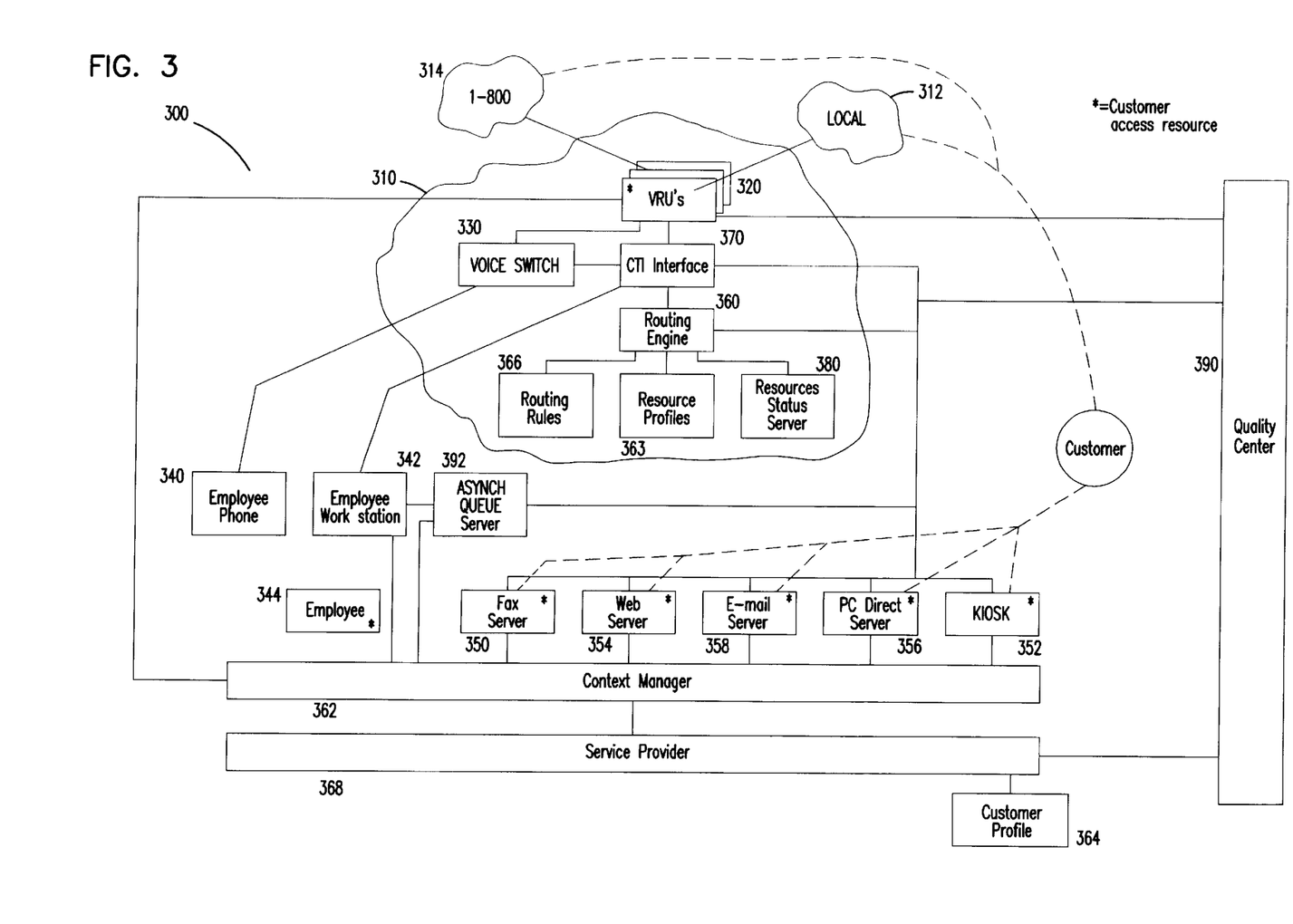
FIG. 3 illustrates a functional diagram of the Virtual Sales and Service Center according to the present invention.

FIG. 3 illustrates a functional diagram of the Virtual Sales and Service Center 300 according to the present invention. Depending on the customer's access method, a number of different resources may accept the initial contact with the customer.

In many companies, the phone is a high volume access method. In the invention a cloud 310 is established to source calls to the Virtual Sales and Service Center 300. All calls, including local numbers 312 and 1-800 numbers 314, are delivered to this cloud 310. Within the cloud 310 are Voice Response Units (VRUs) 320 which play a script that is heard by incoming customers placing calls to the Virtual Sales and Service Center 300. The script played by the VRUs 320 enables a customer profile to be identified. The content of the script is then personalized for each customer, including matching the language being spoken by the caller. The VRUs 320 offer a convenient navigation interface and can both meet customer requests directly or initiate navigation to a resource that can handle the customer request. The VRUs 320 can also execute some cross-sell activities.

Should it be determined that a call needs to be directed to a company employee or other resource, the VRUs interact with the routing engine 360 through the CTI interface 370 to initiate the transfer. The routing engine 360 accesses ANI and DNIS information, customer profile information 364, VRU activity thus far, the routing rules 366, resource profiles 363, and the resource status server 380 to select an available resource based on the customer's expressed or implied need.

ANI is a service offered by telephone networks that provides the billing directory number associated with a calling party. When a customer calls an 800 number to order from a catalog, the call arrives at the call center with the caller's telephone number. The telephone number is passed to a CTI server 370.

Organizations that maintain multiple 800 numbers can also use Dialed Number Identification Services (DNIS) offered by carriers to identify what the caller wishes to discuss. A bank, for example, can assign 800-555-1333 to VISA cards and 800-555-1334 to VISA Gold cards.

The Virtual Sales and Service Center 300 according to the present invention may combine the use of ANI and DNIS with the other information available to it. Furthermore, CTI systems 370 using ANI make it possible for companies to capture information about abandoned calls. If a customer hangs up while waiting for any type of sales and service resource employees can pro-actively call back customers and offer to be of assistance.

Routing rules 366 are not based on a single queue or gate (e.g. Service) but can be governed by which resource skills can most accurately address the request. Once any type of sales and service resource has obtained a new skill or improved on an existing skill, it becomes a simple task of updating that skills profile 364. Similarly, if additional customer information needs to be included in the routing rules 366, the customer profile 364 is updated to include the routing criteria. Overflow rules within the routing rules 366 are also automated to allow for increased call center management.

Upon obtaining all relevant available requirements information the routing application 360 will access the resource profiles 363 to find resources with the appropriate skills. This resulting set of resources will be used when accessing a statistics server 380 to determine which resources are currently available for the contact. The statistics server 380 provides a real time status of each of the resources' availability. A specific resource will then be selected based on resource availability, skill profiles, and load balancing. If the statistics server 380 indicates that the optimal resource is not available, the routing engine 360 will check its routing rules 366 for overflow processing.

If the overflow resources are available, the call and associated data will be routed to those resources. If the original destination resource and the first overflow resources are not available, the call will be routed to another resource based upon the routing rules.

The routing engine 360 then notifies the VRU 320 with the appropriate call treatment and routing authorization once a resource is selected. The VRUs 320 then send the call to the switch 330 which interacts with the CTI interface 370 to determine the appropriate employee 344 and phone 340. The CTI interface 370 also interacts with the workstation 343 associated with the phone 344 and ensures a screen pop, which provides the employee with the key information such as the customer identity, their need and the presence of a cross-sell opportunity, is delivered at the same time as the actual customer phone call is delivered to the phone 340 by the switch 330.

Contacts may also arrive at a web server 354, a home PC direct connection server 356, a kiosk 353, an e-mail server 358 or a fax server 350.

In all cases, every customer contact is immediately logged with the context manager 362. The Context Manager 350 manages the complexity of dealing with multiple customer interaction devices which must share common business processes. These business processes are distributed across many underlying, heterogeneous systems. The Context manager 362 provides for the management of information which is required over the life of a business event. The Context Manager 350 coordinates access to the appropriate Service Providers 368 and provides the Service Provider 368 the context to complete the business transaction.

As a contact progresses, the VRU 320, the employee workstation 343, the web server 354, the kiosk 353, the fax server 350, the e-mail server 358 and the PC direct server 356 continually interact with the context manager 362.

Contacts may be transferred between resources many times during the course of a call and this transfer activity is coordinated by the context manger 363 and the routing engine 360.

If the contact is asynchronous or if there is work which was initiated but not completed during the course of a synchronous contact, resources may request that the context manager 362 place a request with an asynchronous queue server 392. The routing engine 360 will coordinate the subsequent matching of that request with an available resource which will most often be an employee 344, but may be other resource types.

The Virtual Sales and Service Center 300 uses a suite of products to enable intelligent contact routing in a network cloud, including customer profiles 364, employee skills profiles 363, VRU options 320, availability of employees 340, and overflow management within the routing rules 366. In the preferred embodiment, Genesys computer telephony processing components 360 370 380 provides optimized and flexible solutions to transform the operations from simple interactions between phone calls and voice switch queues into sophisticated high value information exchanges that accomplish real-time matching of customer contacts through any access method with the appropriate resources.

All components in FIG. 3 communicate via LAN-based TCP/IP messaging. This open, distributed architecture provides a scaleable and adaptable solution.

Figure 4:
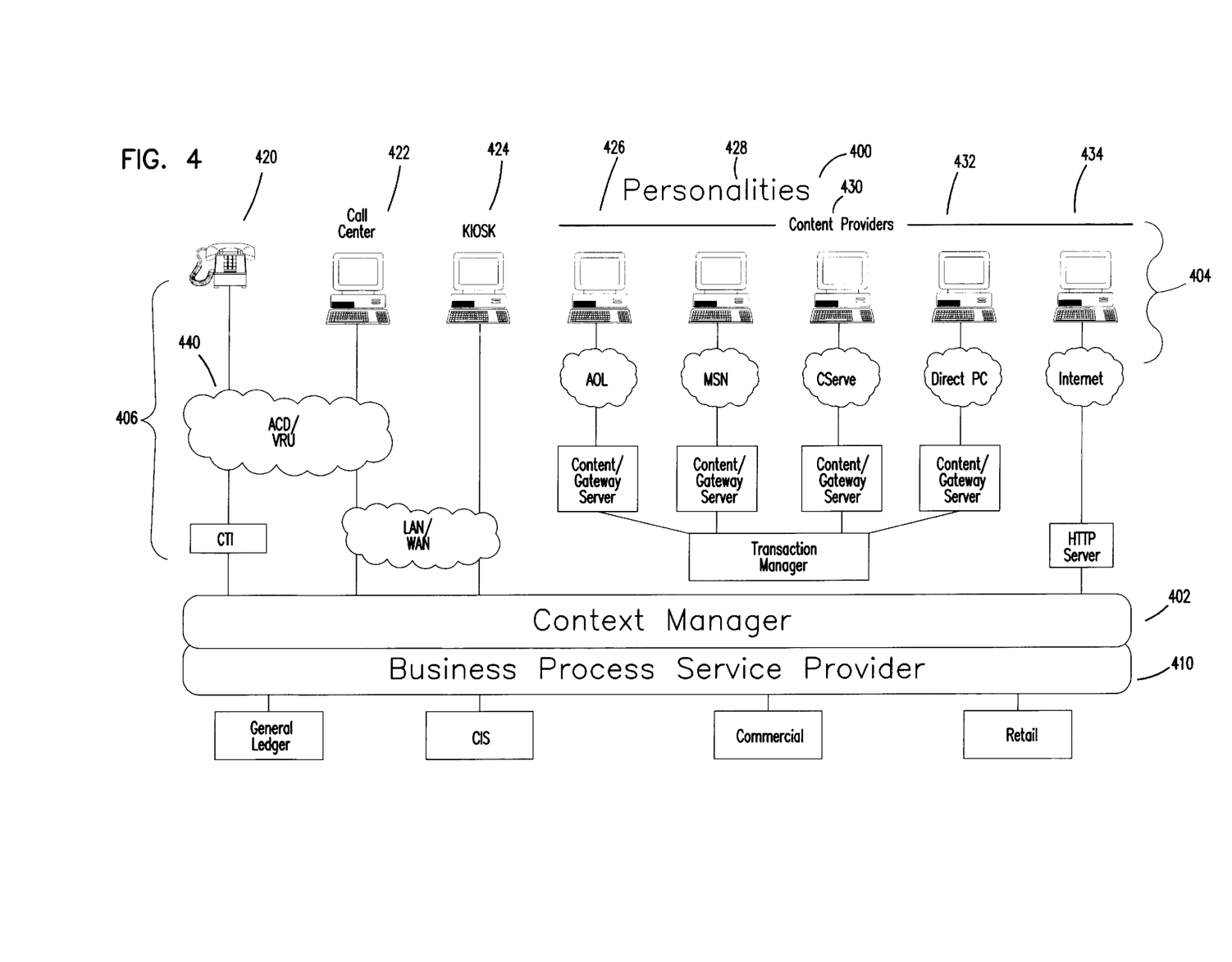
FIG. 4 illustrates an overview of the Context Manager.

FIG. 4 illustrates an overview 400 of the Context Manager 402. The Context Manager 402 provides management capability for multiple customer access resources 404 which share common business processes that may be distributed across many underlying, heterogeneous systems 406. The Context Manager 402 provides the management of information required over the life of the business event. The Context Manager 402 coordinates access to the appropriate business processes and provides them the context to complete each business unit of work.

The Context Manager 402 provides the interface between the business process service provider 410 and the different customer access resources 420–434. Customer access resource types 420–434 are often defined very broadly. Within each type there will be many variants which not only vary due to their specific purpose, but also vary in their behavior as they personalize the customer experience.

While intelligent routing provides rich functionality, the data it uses to make decisions on call attributes must be processed very fast. Customer profiles, customer accounts, and traditional account data will be accessed by a VRU 440 and customer initiated VRU events will be passed to a service provider 410. The service provider 410 maintains the business logic in channel independent applets.

The service provider 410 applies decision logic to determine the customers needs. The result will be a contact routing profile that the intelligent routing engine will use to match against the centrally maintained employee profile. The result will be an intelligent routing rule based on custom call profile and skilled employee availability.

The cloud 440 will pass pertinent routing information to the service provider 410 from the VRU. The service provider 410 will then perform a logical combine of the VRU attributes and the customer profile attributes to determine the true routing attributes of the call. For example, in the context of banking, if a customer performed a loan payoff request in the VRU and had a cross-sell indicated on their customer profile, then the routing profile would indicate that a cross-sell was "Yes". This routing information may include tier, product(s), type of service, type of customer banking, language captured from DNIS, and number of transfers indicator.

The present invention emphasizes the use of Component and Object Technology. The Object Management Group's (OMG) Common Object Request Broker Architecture (CORBA) may be used for distributed computing and object messaging. In this manner, product availability, openness and functionality goals can be satisfied.

With the introduction of a Virtual Sales and Service Center, some of the typical activities that take place at each individual call center will change. Rather than managing each location as a separate facility, all centers are managed and operated as a single virtual organization. There are also workforce implications with the implementation of this new environment.

Turning again to FIG. 3, a centralized operating unit, referred to as the Quality Center 390, performs the Virtual Sales and Service Center monitoring and reporting functions. The Quality Center 390 integrates and aids in managing a plurality of physical locations as a single Virtual Sales and Service Center 300.

To achieve the operational efficiency and customer experience goals, multiple call centers operate as part of a single Virtual Sales and Service Center. With the introduction of a Virtual Sales and Service Center, some activities that typically take place at each individual call center are performed differently. For example, rather than managing each location as a separate facility, all centers are managed and operated as a single virtual organization.

Figure 5:
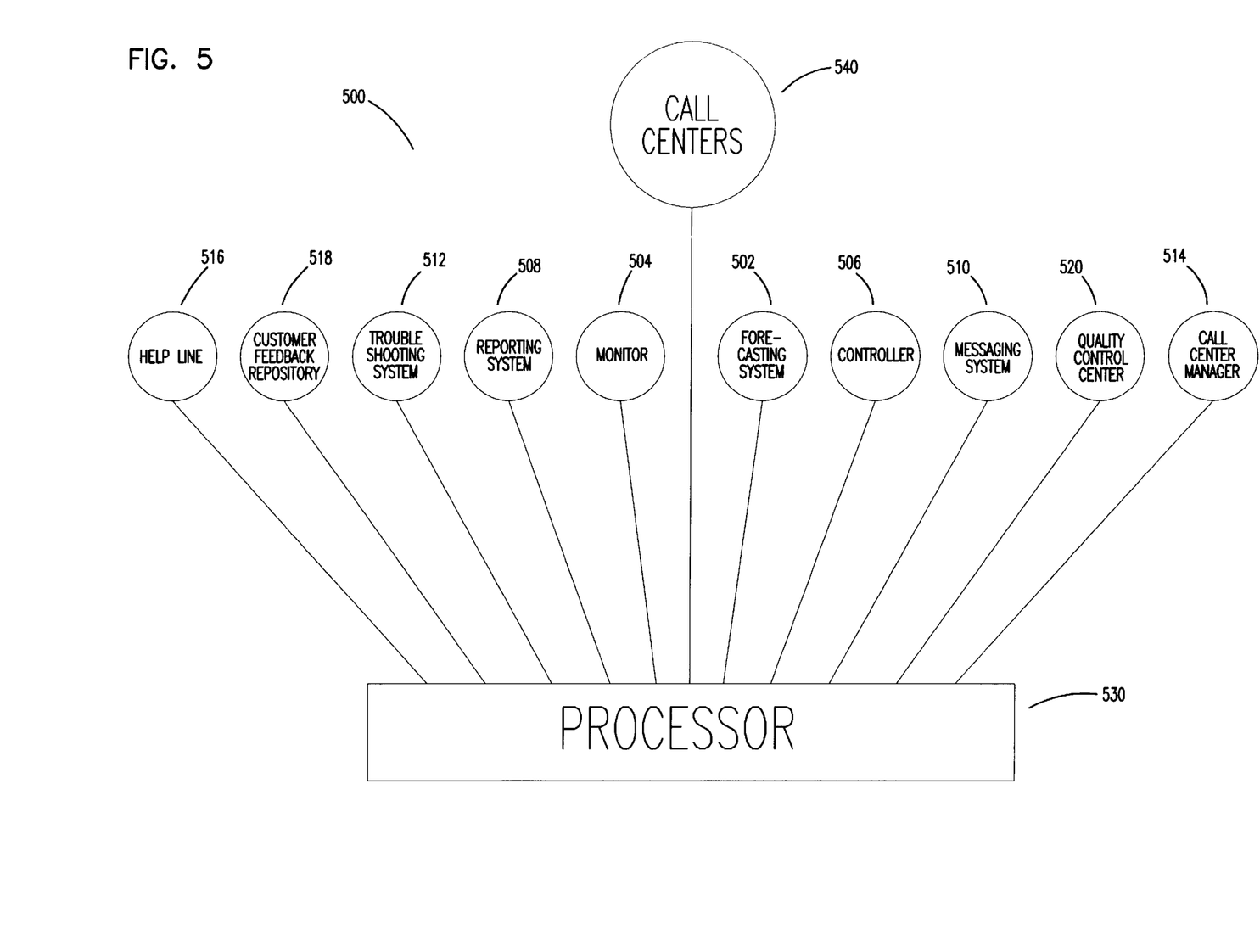
FIG. 5 illustrates a functional block diagram of the operations of the Quality Center.

According to the invention, a new centralized operating unit, referred to as the Quality Center, performs many of the functions that typically reside in a call center control tower. FIG. 5 illustrates a functional block diagram 500 of the operations of the Quality Center. For example, the Quality Center performs forecasting 502, monitoring 504, controlling of network routing 506, reporting 508, messaging 510 and trouble-shooting 512. A call center manager 514, a helpline 516, a customer feedback repository 518, and a quality control center 520 are also provided.

While a detailed explanation of the business processes for operating and supporting a multi-site, Virtual Sales and Service Center is provided below with reference to FIG. 6, a brief overview of the functional operations of the Quality Center will first be described.

FIG. 5 illustrates a forecasting system 502 coupled to a processor 530 for developing forecasts of monthly contact volume for each of the call centers 540. A reporting system 508 generates reports regarding the performance of each call center. Reports are compiled periodically. Input may be provided to the Quality Center by each of the call centers 540 using fax, telephone calls and/or electronic mail. These reports may then be reformatted and re-distributed to each of the call centers.

A monitor 504 is used for real time monitoring of contact volume for the physical locations 540. The call volume information is used to help guide network routing decisions. A network routing controller 506 makes modifications to the percentage of calls that are routed among some call centers.

A messaging system 510 provides E-Mails/CC Mail Messages for maintaining contact with physical locations. E-mail messages are used to report system availability, outages, etc. A trouble-shooting system 512 is used for identifying and solving technical problems in the call centers.

A call center manager 514 monitors call volume in real-time according to selected parameters. A helpline 516 is used for identifying and resolving operational problems. A customer feedback repository 518 is used for storing feedback from customers and a quality control center verifies call handling efficiency, fulfillment timeliness and accuracy checkpoints. The processor 530 provides an interface between the different systems and services requests and response therebetween.

All of these functions apply directly to future client business opportunities and the Quality Center is extendible to additional call center facilities. Furthermore, the Quality Center must be flexible enough to easily adapt to supporting other future call center business partners.

The Quality Center is responsible for monitoring the "customer experience" across the telephone customer access resource. Real-time adherence information is not a business requirement; reporting adherence information is a business requirement. Since contact routing is handled in the up-front cloud, all forecasting and most scheduling is handled by the Quality Center. As a result, no forecasting is handled at the local call center level even though some scheduling is handled at the local level. This is a dramatic paradigm shift from the operating environment currently in operation. The Quality Center must assist in managing the business of operating multiple call centers as a single Virtual Sales and Service Center.

Figure 6:
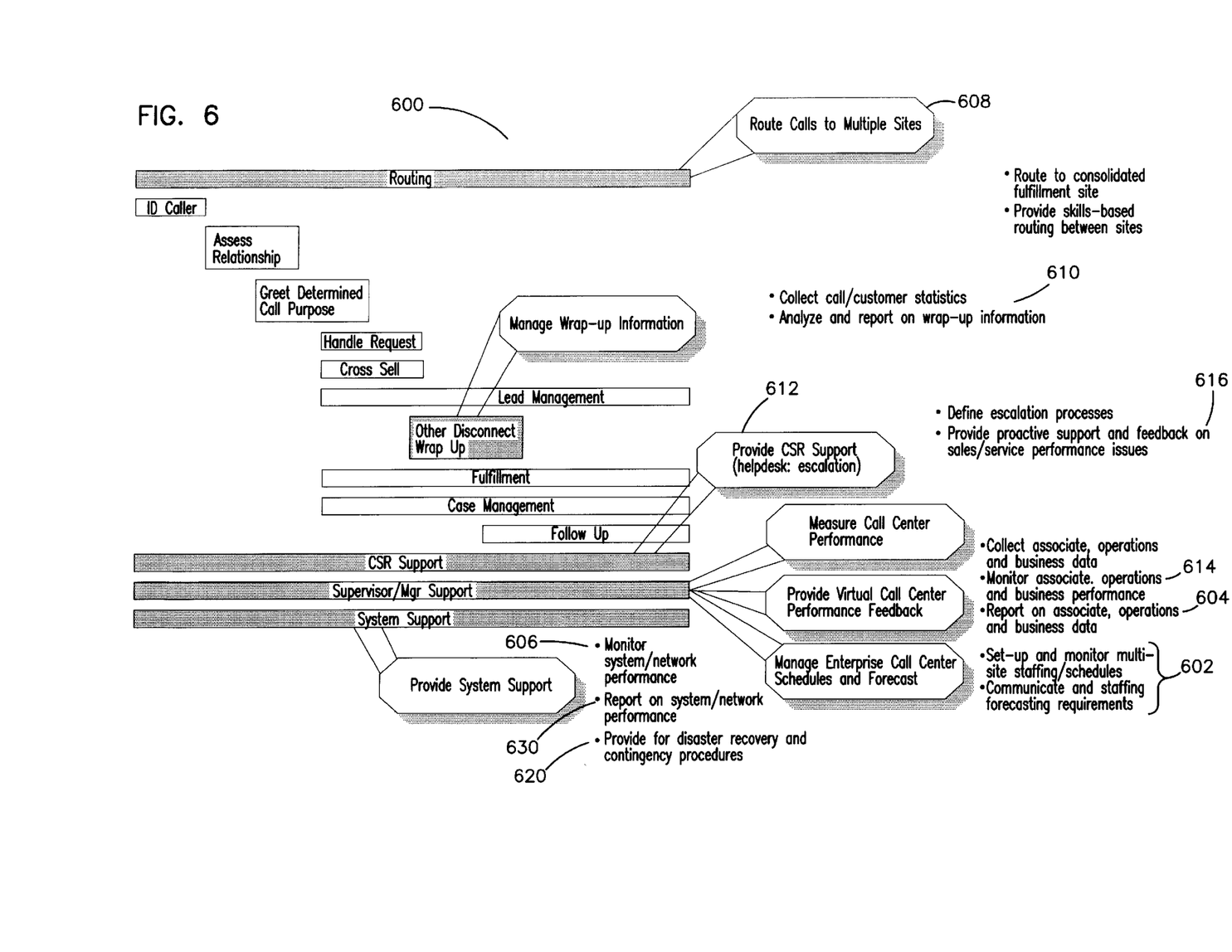
FIG. 6 is a outline of the business processes for operating and supporting a multi-site, Virtual Sales and Service Center as illustrated in the functional block diagram of FIG. 5.

FIG. 6 illustrates the business processes 600 for operating and supporting a multi-site, Virtual Sales and Service Center. In FIG. 6, several functions pertaining to management of the business through the Quality Center are explained. These functions support the overall business process associated with operating a Virtual Sales and Service Center environment. Within each business area, the focus is on distinct business processes needed to operate and support the multi-site, Virtual Sales and Service Center environment.

As mentioned, the Quality center is responsible for scheduling and forecasting of contact volume 602. This also includes associated space and equipment impacts. The Quality Center is responsible for forecasting call volume for each call center. Resource and staffing requirements are initially determined by the Quality Center. The tactical decision as to how to have the appropriate coverage at a given call center will be at the site executive's discretion. The process design incorporates both skill group and local site scheduling. The design also links strategic forecasting to staffing and hiring analyses. To facilitate a single virtual environment, team based and skill based scheduling models will be design and implemented. Real-time Adherence provides the monitoring of resources and teams against the developed schedule.

The Quality Center is responsible for Call Center performance management and reporting 604. Call Center management must be able to access statistics and reports on-line and print, if desired. The Quality Center is responsible for generating reports. These reports provide detailed metrics for use in measuring call center performance. End-to-end process flows outline the process for monitoring the environment, analyzing the key statistic, and gathering ad-hoc information. The key is providing data in the appropriate manner to the appropriate audience so that business decisions can be made in a timely fashion. This allows for the creation of a high performance framework for telephone banking.

Figure 7:
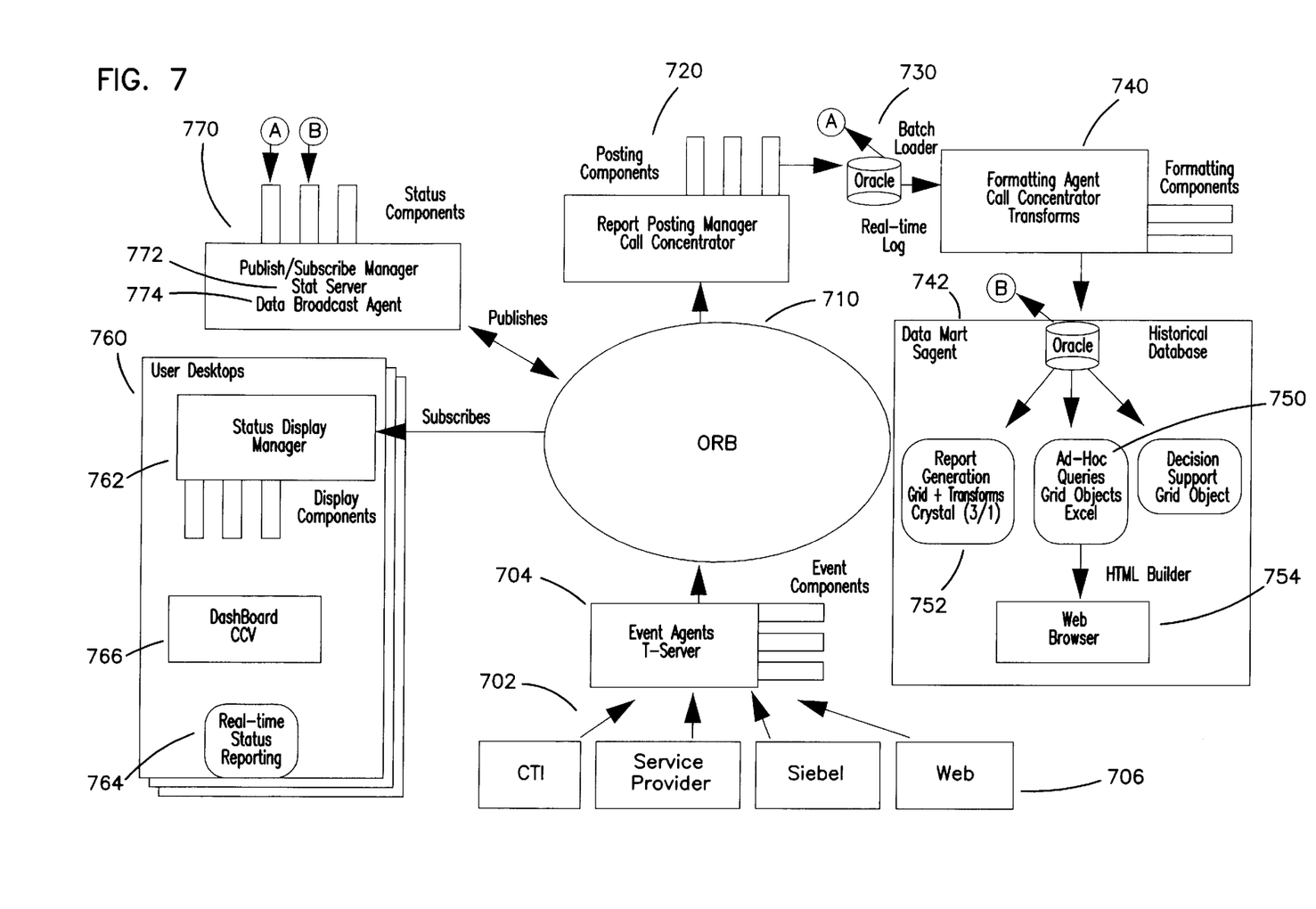
FIG. 7 illustrates an Information Delivery Architecture for enabling the gathering and reporting of performance data for the Quality Center.

To this end an Information Delivery Architecture (IDA) 700, as illustrated in FIG. 7, is provided for enabling the gathering and reporting of performance data. Key performance statistics 702 are gathered by event resources 704 from systems acting as data sources 706, e.g., CTI, VRU, Web, Service Provider, Fulfillment, etc. These statistics are then transferred to an Object Request Broker (ORB) 710 that provides an interface between the different systems. The ORB 710 services requests and response between the different systems. The statistics are posted 720, logged 730 and formatted (transformed) 740 from system events into meaningful business statistics. These business statistics are stored in a data mart 742 to leverage the information reporting capabilities. This information is accessible in several ways including: ad-hoc reports 750, predefined reports 752, and via an OLAP tool 754.

The IDA 700 also provides for the real-time display of key performance data at a user desktop 760. The performance data is tailored 762 for the specific user type, e.g., CSR, team leader, executive, etc. This ensures that information flows to key decision makers for real-time status reporting 764 in order to effectively manage the environment.

A publish/subscribe manager 770 includes a statistics server 772 and a data broadcast resource 774. Accordingly, this broadcast messaging capability enables messages to be broadcast to the virtual environment based on the target recipient. Recipients subscribe to messages intended for their user population.

Accordingly, the Quality Center is a showplace/nerve center/network center. To this end, the Quality Center may include a display board 766, as illustrated in FIG. 7, for illustrating call center information. The call center information displayed on the display board 766 may be categorized by Tier or CSR group type for example. The information may include the average speed of answer, the available resources, and the number of calls on hold.

In addition to providing visibility to call statistics, the Quality Center is a show place for the CTI system and the fulfillment servers. A work area including workstations in the Quality Center is used to monitor contact traffic across all call centers, as well as having access to the CTI system and the fulfillment systems.

Turning again to FIG. 6, the Quality Center also performs call monitoring 606 and routing 608. The Quality Center must be able to monitor call traffic within the Virtual Sales and Service Center environment. The Quality Center must also be able to receive timely reports/information to make any adjustments to handle additional call volume and/or emergency situations, e.g., inclement weather. The Quality Center also has the capability of modifying the routing/overflow rules on a scheduled basis, based on forecast projections and comparisons of previous forecasts to actual volumes.

The Quality Center has real-time information as to the availability of all systems. The Quality Center also has the capability to monitor call volume in real-time via a call center manager using the CSR group or type, i.e., Tier 1, Tier 2, etc. In this environment, a determination that the Tier 1 "group" has a certain amount of call volume can be made, rather than that of a given customer segment. For example, Tier 1 may be taking overflow calls from the Cross-Sell "group" as well as handling Tier 1 customers. The Quality Center does not monitor call volume by separate physical locations.

In a Virtual Sales and Service Center environment, much of the monitoring and re-routing of contact traffic is done automatically. The Quality Center, however, is able to make the following adjustments to handle call volume:

making staffing recommendations to each call center;

change the timing parameters on overflow rules (i.e. 20 seconds to 30 seconds);

add an additional profile for particular resources turn on/off cross-sell prompts; and send out broadcast/alert messages to inform agents of extremely high volume situations.

Call delivery process designs allow for the routing of calls independent of geographic location. Procedures detail the process for the maintenance and set-up of resource profiles and the modification of routing rules/strategies.

The silent monitoring of calls is primarily handled at each individual call center by a Local Quality Team, Site Manager, Sales/Service Manager(s) and/or Team Leaders. Flexibility is built into the Quality Center functionality, whereby, the Center can monitor calls on special occasions, e.g. special promotion.

Routing capabilities 608 are divided into three distinct areas: call routing, call control, and call/data synchronization. The Genesys CTI product set enables the routing of calls in the virtual environment. This allows multi-site support based on a single switch architecture. 800 number services provide contingent routing services in the event of a site disaster.

The Quality Center performs analysis 610 on call center statistics in conjunction with Direct Banking Finance, and make recommendations for improvement. The statistics to be analyzed are those that are linked to the most critical performance measurements in the Performance Measurement DPM. Capabilities for on-line analytical processing (OLAP) enable quality center executives to gather performance information and analyze trends and statistics for operational management of the virtual environment. Decision support tools allow data time slicing and provide graphical reports for viewing key performance statistics.

The Quality Center functions as the main call center contact for technical operations and as a helpline 612. The Quality Center supports call center associates and management for policy, procedure and system questions. Thus, the Quality Center provides the first line of defense for the Virtual Sales and Service Center. In this sense, the Quality Center is the primary point of contact for all questions/problems. Once the problem is logged, the Quality Center decides what is the most effective way to resolve a problem. The Quality Center acts as a central repository of feedback from customers and associates, as well as a coordination point for activities and initiatives designed to enhance the performance of each call center. Internally, the Quality Center provides for associate call monitoring and fulfillment timeliness and accuracy checkpoints 614. Externally, the Quality Center implements customer perception feedback mechanisms 616. Customer Relations associates work in the Quality Center to handle and respond to customer complaints and comments pertaining to the call center.

The Quality Center coordinates silent monitoring of associate calls. For example, if running a special promotion my recommend 50% of the calls be monitored for quality adherence. The Quality Center provides input to Personnel and Training for associates and coordinate all Call Center quality initiatives. Continuous improvement/learning opportunities based on suggestions from customers and resources are implemented through the Quality Center, as are the handling of all customer complaints, compliments, suggestions and feedback. The Quality Center coordinates and provides feedback to marketing regarding the success of cross-sell rules. Further, the Quality Center acts as a central repository for feedback from customers and associates regarding call center operations.

The Quality Center provides contingency procedures 620. The Quality Center has the capability to change resource profile information and customer preference information. To this end, the Quality Center supports several maintenance tasks. The Quality Center supports call treatments for the various customer segments, associate profiles, customer preference information, the ability to change parameters for routing and overflow rules, and block VRU access. Capabilities for maintaining the virtual environment are provided via the Genesys CTI capabilities.

In the event of system problems, or any circumstance where the Quality Center needs to quickly contact the individual call centers, a broadcast messaging capability is provided. The Quality Center reports on system and network performance 630 by providing broadcast messaging capability. This allows the center to send out messages to all call center personnel about the status of systems, anticipated length of down time, status of closed branches, etc. The Quality Center may broadcast messages based on target user populations via a publish/subscribe message capability. Through this function, executives broadcast messages to the virtual environment based on the target recipient. Those recipients subscribe to messages intended for their user population.

In summary, the Quality Center is responsible for monitoring the "customer experience" across the telephone customer access resource. The Quality Center assists in managing the business of operating multiple call centers as a single Virtual Sales and Service Center and presents the business in a professional, informative and impressive manner.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A quality center for ensuring the satisfaction of operational efficiency of a Virtual Sales and Service Center and customer experience goals of customers accessing the Virtual Sales and Service Center, comprising:

a forecasting system for predicting contact volume for a plurality of physical locations forming a Virtual Sales and Service Center;

a monitor for monitoring contact traffic for the Virtual Sales and Service Center;

a controller for controlling network routing based upon the call volume predictions and the contact traffic monitoring;

a processor for providing an interface between the forecasting system, the monitor and the controller and for servicing requests and response there between;

a reporting system for accessing statistics for generating management reports regarding the operation of the Virtual Sales and Service Center;

a messaging system for providing messaging between the physical locations; and a trouble-shooting system for analyzing and solving problems occurring in the Virtual Sales and Service Center.

2. The quality center of claim 1 wherein the reports are compiled periodically.

3. The quality center of claim 1 wherein the messaging system processes messages between the plurality of physical locations regarding system availability and outages.

4. The quality center of claim 1 wherein the reporting system accesses statistics servers for generating history reports.

5. The quality center of claim 4 wherein the history reports provide metrics for use in measuring virtual sales and service center performance.

6. The quality center of claim 1 wherein the processor further comprises a plurality of inputs for receiving signals from the plurality of physical locations.

7. The quality center of claim 6 wherein the signals comprises fax, telephone calls and electronic mail signals.

8. The quality center of claim 1 wherein the monitor monitors information regarding contact volume for the plurality of physical locations in real time.

9. The quality center of claim 8 wherein the contact volume information is used to guide network routing decisions controlled by the controller.

10. The quality center of claim 1 wherein the controller comprises routing rules, the controller making modifications to the routing rules to change how contacts are routed to resources.

11. The quality center of claim 1 wherein the monitor monitors the experience of a customer.

12. The quality center of claim 1 wherein the forecasting system supports planning of resources.

13. The quality center of claim 12 wherein resource planning is based upon an analysis of space and equipment impacts.

14. The quality center of claim 1 wherein the forecasting system enables the planning of resource and staffing requirements.

15. The quality center of claim 1 wherein the forecasting system facilitates staffing and hiring analysis.

16. The quality center of claim 1 wherein the forecasting system facilitates a single virtual environment implementing team based and skill based scheduling models.

17. The quality center of claim 1 wherein the forecasting system provides real-time adherence of resources and teams against a schedule.

18. The quality center of claim 1 wherein the monitor measures end-to-end process flows for outlining the process for monitoring the Virtual Sales and-Service Center, analyzing the key statistics, and gathering information.

19. The quality center of claim 1 wherein the monitor provides data to decision makers for maintaining a high performance framework for business processes.

20. The quality center of claim 1 further comprising an information delivery architecture for enabling the gathering and reporting of performance data.

21. The quality center of claim 20 wherein the information delivery architecture gathers performance data from computer telephony interfaces, voice response units, Internet sources, a service provider and a fulfillment server.

22. The quality center of claim 20 wherein the processor gathers statistics from system events and transforms the statistics into business statistics.

23. The quality center of claim 22 wherein the business statistics are stored in a data mart to leverage the information reporting capabilities.

24. The quality center of claim 23 wherein the data mart allows access to the business statistics.

25. The quality center of claim 1 further comprising a display for displaying performance data.

26. The quality center of claim 25 wherein the displayed performance data may be specifically tailored for different users to ensure that information flows to key decision makers in a timely manner in order to effectively manage the virtual sales and service center.

27. The quality center of claim 1 wherein the monitor monitors contact traffic within the Virtual Sales and Service Center for making adjustments to contact routing.

28. The quality center of claim 27 wherein the contact routing is modified on a scheduled basis based on forecast projections and comparisons of previous forecasts to actual volumes.

29. The quality center of claim 1 wherein the monitor receives real-time information as to the availability of all systems.

30. The quality center of claim 1 further comprises a virtual sales and service center manager for monitoring call volume in real-time according to selected parameters.

31. The quality center of claim 30 wherein the selected parameters comprises customer types.

32. The quality center of claim 31 wherein the selected parameters comprises Physical Location volume.

33. The quality center of claim 1 wherein the monitor facilitates adjustments to the Virtual Sales and Service Center for making resource staffing recommendations to each Physical Location.

34. The quality center of claim 1 wherein the monitor facilitates adjustments to the Virtual Sales and Service Center for changing the timing parameters on overflow rules.

35. The quality center of claim 1 wherein the monitor facilitates adjustments to the Virtual Sales and Service Center for adding an additional profile for particular resources in a Physical Location.

36. The quality center of claim 1 wherein the monitor facilitates adjustments to the Virtual Sales and Service Center for initiating cross-sell efforts.

37. The quality center of claim 1 wherein the processor performs analysis on virtual sales and service center statistics in conjunction with business parameters.

38. The quality center of claim 1 further comprising on-line analytical processing for promoting the gathering of performance information and analysis of trends and statistics for operational management of the Virtual Sales and Service Center.

39. The quality center of claim 1 further comprises a helpline for identifying and resolving operational problems.

40. The quality center of claim 1 further comprising a customer feedback repository for storing feedback from customers.

41. The quality center of claim 1 further comprising a quality control center for verifying call handling efficiency, fulfillment timeliness and accuracy checkpoints.

42. The quality center of claim 1 wherein the messaging system provides immediate broadcast messages to resources in the plurality of physical locations.

43. The quality center of claim 42 wherein the broadcast messages are based upon target user populations via a publish/subscribe message.

44. A quality center for ensuring the satisfaction of operational efficiency of a Virtual Sales and Service Center and customer experience goals of customers accessing the Virtual Sales and Service Center, comprising:
    a forecasting system for predicting contact volume for a plurality of physical locations forming a Virtual Sales and Service Center;
    a monitor for monitoring contact traffic for the Virtual Sales and Service Center;
    a controller for controlling network routing based upon the call volume predictions and the contact traffic monitoring; and
    a processor for providing an interface between the forecasting system, the monitor and the controller and for servicing requests and response there between;
    wherein the forecasting system uses skill group and local site scheduling to predict contact volume.

45. A quality center for ensuring the satisfaction of operational efficiency of a Virtual Sales and Service Center and customer experience goals of customers accessing the Virtual Sales and Service Center, comprising:
    a forecasting system for predicting contact volume for a plurality of physical locations forming a Virtual Sales and Service Center;
    a monitor for monitoring contact traffic for the Virtual Sales and Service Center;
    a controller for controlling network routing based upon the call volume predictions and the contact traffic monitoring; and
    a processor for providing an interface between the forecasting system, the monitor and the controller and for servicing requests and response there between;
    wherein the monitor facilitates adjustments to the Virtual Sales and Service Center for sending out broadcast/ alert messages to warn the physical locations of extremely high volume situations.

46. A quality center for ensuring the satisfaction of operational efficiency of a Virtual Sales and Service Center and customer experience goals of customers accessing the Virtual Sales and Service Center, comprising:
    a forecasting system for predicting contact volume for a plurality of physical locations forming a Virtual Sales and Service Center;
    a monitor for monitoring contact traffic for the Virtual Sales and Service Center;
    a controller for controlling network routing based upon the call volume predictions and the contact traffic monitoring; and
    a processor for providing an interface between the forecasting system, the monitor and the controller and for servicing requests and response there between;
    wherein the controller provides capabilities for contact routing, contact control, and contact/data synchronization.

47. A quality center for ensuring the satisfaction of operational efficiency of a Virtual Sales and Service Center and customer experience goals of customers accessing the Virtual Sales and Service Center, comprising:

a forecasting system for predicting contact volume for a plurality of physical locations forming a Virtual Sales and Service Center;

a monitor for monitoring contact traffic for the Virtual Sales and Service Center;

a controller for controlling network routing based upon the call volume predictions and the contact traffic monitoring; and a processor for providing an interface between the forecasting system, the monitor and the controller and for servicing requests and response there between;

wherein the controller is operatively coupled to a computer telephony interface for changing resource profile information and customer preference information to adjust routing and overflow operation.

48. A quality center method for ensuring the satisfaction of operational efficiency of a Virtual Sales and Service Center and customer experience goals of customers accessing the Virtual Sales and Service Center, comprising the steps of:

predicting contact volume for a plurality of physical locations forming a Virtual Sales and Service Center;

monitoring contact traffic for the Virtual Sales and Service Center;

controlling network routing based upon the call volume predictions and the contact traffic monitoring;

providing an interface between the forecasting, monitoring and controller and for servicing requests and response there between;

accessing statistics for generating management reports regarding the operation of the Virtual Sales and Service Center;

providing messaging between the physical locations; and analyzing and solving problems occurring in the Virtual Sales and Service Center.

49. The quality center method of claim 48 wherein the step of messaging further comprises the step of processing messages between the plurality of physical locations regarding system availability and outages.

50. The quality center method of claim 48 wherein the step of reporting further comprises the step of accessing statistics servers for generating history reports.

51. The quality center method of claim 48 wherein the step of monitoring further comprises the step of monitoring information regarding contact volume for the plurality of physical locations in real time.

52. The quality center method of claim 48 wherein the step of controlling further comprises the step of making modifications to the routing rules to change how contacts are routed to resources.

53. The quality center method of claim 48 wherein the step of forecasting further comprises the step of planning of resources.

54. The quality center method of claim 48 wherein the step of monitoring further comprises the step of measuring end-to-end process flows for outlining the process for monitoring the Virtual Sales and Service Center, analyzing thee key statistics, and gathering information.

55. The quality center method of claim 48 further comprising the step of enabling the gathering and reporting of performance data.

56. The quality center method of claim 48 further comprising the step of displaying performance data on a display.

57. The quality center method of claim 48 wherein the step of controlling further comprises the step of modifying contact routing on a scheduled basis based on forecast projections and comparisons of previous forecasts to actual volumes.

58. The quality center method of claim 48 wherein the step of monitoring further comprises the step of receiving real-time information as to the availability of all systems.

59. The quality center method of claim 48 further comprising the step of call volume monitoring in real-time according to selected parameters.

60. The quality center method of claim 48 wherein the step of processing further comprises the step of performing analysis on virtual sales and service center statistics in conjunction with business parameters.

61. The quality center method of claim 48 further comprising the step of promoting the gathering of performance information and analysis of trends and statistics for operational management of the Virtual Sales and Service Center using an on-line analytical processor.

62. The quality center method of claim 48 further comprising the step of identifying and resolving operational problems using a helpline.

63. The quality center method of claim 48 further comprising the step of storing feedback from customers using a customer feedback repository.

64. The quality center method of claim 48 further comprising the step of verifying contact handling efficiency, fulfillment timeliness and accuracy checkpoints using a quality control center.

* * * * *